United States Patent
Ungruh et al.

(10) Patent No.: US 6,480,582 B1
(45) Date of Patent: Nov. 12, 2002

(54) E-MAIL SERVER OF A PROVIDER OF E-MAIL SERVICES

(75) Inventors: Joachim Ungruh, München (DE); Silvia Krob, München (DE); Hendrik Kurzawa, München (DE); Christian Schmidt, Augsburg (DE); Thomas Lange, Landshut (DE); Andreas Lindenthal, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/424,603
(22) PCT Filed: May 27, 1998
(86) PCT No.: PCT/DE98/01456
§ 371 (c)(1), (2), (4) Date: Nov. 24, 1999
(87) PCT Pub. No.: WO98/54873
PCT Pub. Date: Dec. 3, 1998

(30) Foreign Application Priority Data

May 27, 1997 (DE) ...................................... 297 09 293 U

(51) Int. Cl.[7] ............................................. H04M 11/00
(52) U.S. Cl. ................................. 379/93.14; 379/88.12; 709/206
(58) Field of Search .......................... 379/93.24, 93.23, 379/93.01–93.08, 88.11, 88.12, 88.17; 709/204, 206

(56) References Cited

U.S. PATENT DOCUMENTS 5,138,653 A     8/1992    Le Clercq
5,850,519 A * 12/1998    Vazana ........................ 709/206

FOREIGN PATENT DOCUMENTS

EP     0 798 899 A1    10/1997

* cited by examiner

Primary Examiner—Wing Chan
(74) Attorney, Agent, or Firm—McCormick, Paulding & Huber LLP

(57) ABSTRACT

The invention enables a telephone subscriber to be advised via his telephone line of the arrival of a new e-mail. This is achieved by the e-mail server informing the point of presence (POP) of a subscriber to the Internet of the presence of mail, the POP passing this information to the local exchange of the subscriber, which in turn informs the subscriber of the presence of mail.

6 Claims, 1 Drawing Sheet

E-MAIL SERVER OF A PROVIDER OF E-MAIL SERVICES

BACKGROUND OF THE INVENTION

1. Field of the Invention

The present invention relates generally to an e-mail server and method for reporting presence of new e-mail to a subscriber.

2. Description of the Related Art

Currently a subscriber can only discover whether or not he has received a new e-mail by logging on to his e-mail service provider. Particularly for users who only use the e-mail service in the context of the Internet, this involves effort and expense (starting up the computer, logging on and incurring charges) with only a low level of e-mail correspondence. The user may not be automatically informed of the arrival of new e-mails (particularly not without turning on the computer). No solution currently exists to this problem.

SUMMARY OF THE INVENTION

The present invention enables a telephone subscriber to be advised via his telephone line of the arrival of a new e-mail. This is effected by means of a specially sounded ring and optionally a display on the screen of the apparatus.

The advantage of the invention is that the e-mail user can be informed, independently of his PC, that there is a new e-mail. The e-mail recipient is informed via his telephone connection that an e-mail has arrived. This interaction between telephone network and Internet is entirely novel.

BRIEF DESCRIPTION OF THE DRAWINGS

An exemplary embodiment of the invention is described in more detail in the following text with the aid of the drawing. The drawing comprises one FIGURE.

DETAILED DESCRIPTION OF THE PREFERRED EMBODIMENTS

Figure 1:
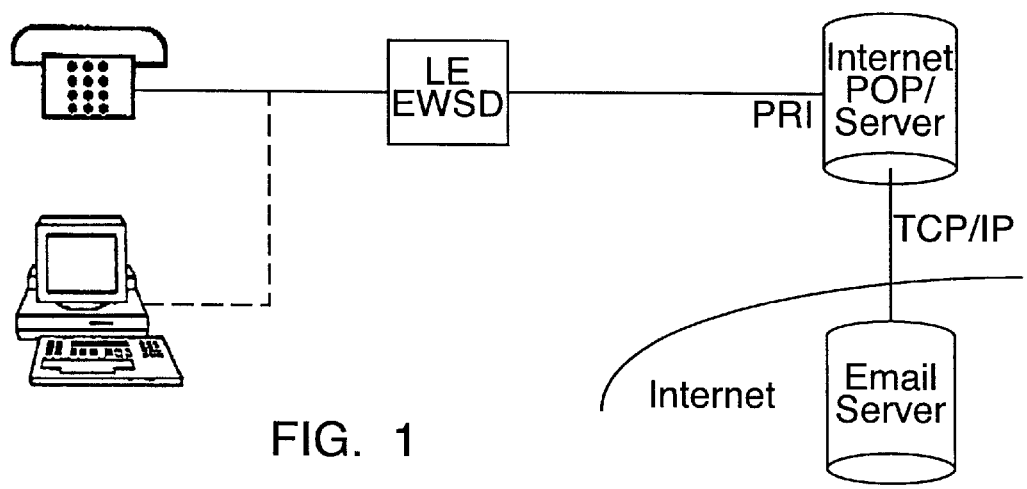

As illustrated in the FIGURE, the e-mail server of the e-mail service provider informs the POP (point of presence), via a TCP/IP message, of any changes to the subscriber's mail status (e.g. new mail received). This message contains the subscriber's E.164 number and the subscriber's mail status (i.e. the number of unread e-mails). A special application on the POP isolates this data and transmits the mail status in a D channel message (e.g. register or facility) via a primary multiplexed line PRI to the local exchange LE of the subscriber. The subscriber is identified by means of the E.164 number. The information is temporarily stored in a central processor of the local exchange LE and sent to the line trunk group to which the subscriber is connected. In the event that new e-mails have arrived, a special ring is sounded to the subscriber, and in the case of ISDN keypad subscribers the number of new e-mails is also displayed on the screen.

To provide the information path described above, the following addresses must be stored on the e-mail server for every subscriber:

E.164 address of the subscriber (to indicate the presence of new e-mail)

IP address of the subscriber (for mail delivery)

IP address of the associated POP (for linking Internet and EWSD).

Although other modifications and changes may be suggested by those skilled in the art, it is the intention of the inventors to embody within the patent warranted hereon all changes and modifications as reasonably and properly come within the scope of their contribution to the art.

What is claimed is:

1. An e-mail system, comprising:

a server of an e-mail service provider configured to transmit a message to inform a point of presence (POP) of a subscriber of presence of new mail, the point of presence being connected to the Internet by telephone network, the server including in said message a telephone network number of the subscriber.

2. An e-mail system as claimed in claim 1, wherein said message is an Internet message.

3. A method for informing an e-mail subscriber of new e-mail via a point of presence of a subscriber connected to the Internet via the telephone network, comprising the steps of:

receiving a message from an e-mail server indicating presence of new mail for the subscriber;

drawing a telephone network number of the subscriber from the message received; and passing in a subsequent message information indicating presence of new mail to a local exchange of the subscriber.

4. A method as claimed in claim 3, wherein said subsequent message is a telephone network message.

5. A method for advising an e-mail subscriber of presence of mail, comprising the steps of:

informing a point of presence (POP) of a subscriber connected to the Internet by a telephone network of presence of mail by an e-mail server;

passing the information from the point of presence (POP) to a local exchange of the subscriber; and informing the subscriber of the presence of mail by the local exchange.

6. An e-mail notification method, comprising the steps of:

providing an e-mail server of an e-mail service provider;

informing a point of presence (POP) of a subscriber, connected to the Internet via the telephone network of presence of new mail by a message, said message being sent by said e-mail server; and including in said message a telephone network number of the subscriber.

* * * * *